United States Patent [19]

Sano

[11] 4,247,519

[45] Jan. 27, 1981

[54] EXHAUST GAS TREATMENT DEVICE FOR INJECTION MOLDING MACHINES

[75] Inventor: Tsutomu Sano, Kobe, Japan

[73] Assignee: Kobe Steel, Ltd., Kobe, Japan

[21] Appl. No.: 98,805

[22] Filed: Nov. 30, 1979

[51] Int. Cl.³ .............................................. B01D 50/00
[52] U.S. Cl. ..................................... 422/169; 55/183;
  55/212; 55/315; 55/269; 55/189; 264/102;
  425/203; 425/587; 137/565; 417/395
[58] Field of Search ................. 55/183, 269, 189–195,
  55/210, 212, 213, 208, 467, 55, 57, 315,
  312–314; 264/102, 328, 329; 425/203, 587;
  137/565; 417/395; 422/169

[56] References Cited

U.S. PATENT DOCUMENTS

| | | |
|---|---|---|
| 2,378,539 | 6/1945 | Dawihl . |
| 2,964,513 | 12/1960 | Dale . |
| 3,244,688 | 8/1966 | Goins . |
| 3,253,303 | 5/1966 | Bradt . |
| 3,917,507 | 11/1975 | Skidmore . |
| 3,937,778 | 2/1976 | Tanaka . |
| 3,981,649 | 9/1976 | Shimano et al. . |
| 3,992,500 | 11/1976 | Kruder et al. . |
| 4,051,212 | 9/1977 | Grigat et al. . |
| 4,181,510 | 1/1980 | Sano et al. ........................... 55/183 |

FOREIGN PATENT DOCUMENTS 53-28020  8/1978  Japan ............................................ 55/95

*Primary Examiner*—Bernard Nozick
*Attorney, Agent, or Firm*—Oblon, Fisher, Spivak, McClelland & Maier

[57] ABSTRACT

An exhaust gas treating device for injection molding machines, in which a vent port of a vented injection machine is connected to a vacuum and an exhaust gas treating mechanism for treating the gas discharged from the vent port characterized in that a mist separator, the vacuum pump, an air-water separator and a deodorizing unit are disposed in the above-mentioned order from the vent port side and in communication with the vent port.

4 Claims, 1 Drawing Figure

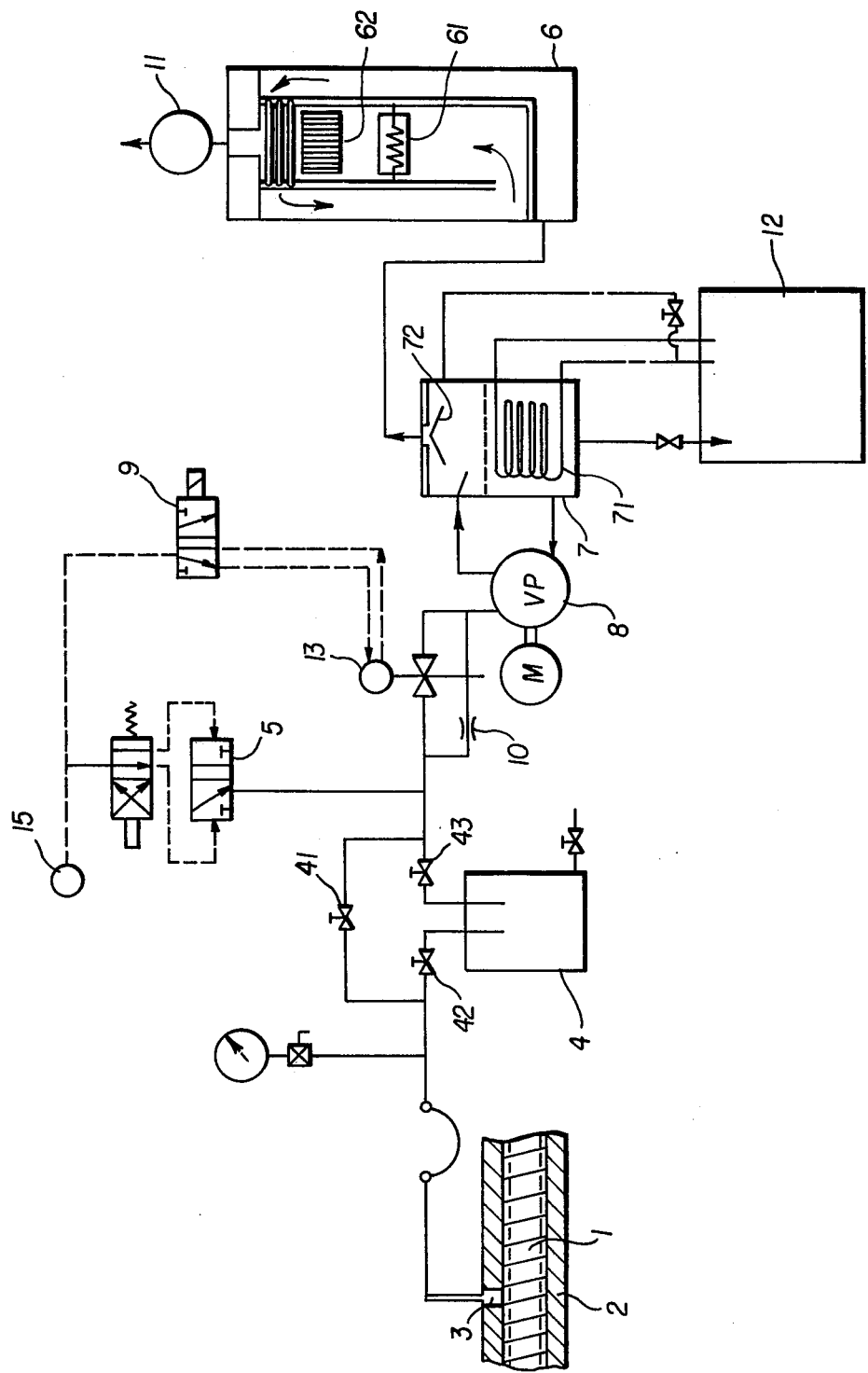

EXHAUST GAS TREATMENT DEVICE FOR INJECTION MOLDING MACHINES

BACKGROUND OF THE INVENTION

1. Field of the Invention

This invention relates to an exhaust gas treatment device for injection molding machines which prevents injection material from escaping through the vent, de-aerates and effectively treats the exhaust gas from the vent.

2. Description of the Prior Art

Conventional exhaust gas treatment devices are known to be directly connected to the vent of the injection molding machines or installed separately from the injection molding machine. They either release the exhaust gas directly into the open air or extract the gas through the vent by applying negative pressure to the vent by a vacuum pump. The conventional exhaust gas treatment device, however, has the following drawbacks.

In a system where the gas is extracted by the vacuum pump, the gas can be extracted satisfactorily, but when the screw stops rotating and the molten resin expands, part of the molten resin cannot be prevented from escaping through the vent depending on the kind of resin used and the quantity of gas contained in the melted resin even if the vacuum degree in the vent is decreased; the tarlike components contained in the gas exhausted from the vent adhere to the inner wall of the exhaust gas treatment device, the heater and the catalysts and when the device is restarted after some interval the sticking tar is directly heated and oxidized, raising the temperature within the device to an abnormally high level, which may result in a explosion of the device. Thus, it has been necessary to provide the exhaust gas treatment device with an apparatus for removing explosive gases. The causes for this explosion can be enumerated as follows.

(a) Since the gas exhausted from the vent is directly and continuously treated, the concentration of oxygen contained in the gas becomes low and the combustion of the gas becomes incomplete.

(b) The tar contained in the untreated gas adheres to the catalysts so that the concentration of gas becomes high and an abnormal heat generation occurs when the device restarts its operation.

Since in the conventional device the treated hot (about 350°) gas is directly released into the open air or drawn into the vacuum pump, there is a possibility of causing accidents when the hot gas is exhausted into the atmosphere or sucked into the pump.

To solve these problems the inventor of this invention formerly proposed to install a deodorizing device and a mist separator between the vent and the vacuum pump. However, this provision poses the following problems: The pressure in the vent must be sharply reduced to a level of −680 to −720 mm Hg immediately (within two seconds) after the screw has begun to rotate. However, provision of the deodorizing device between the vent and the vacuum pump requires a pump with large capacity which will result in an increase in the cost of investment and the running cost. Further, when a large amount of air is abruptly sucked, the vacuum pump blows up a large amount of water. This will shorten the life of the vacuum pump and the water blown up will generate secondary pollution.

SUMMARY OF THE INVENTION

The object of this invention is to overcome the above-mentioned drawbacks by arranging the deodorizing device down-stream of the vacuum pump and providing an air-water separator tank between the deodorizing device and the vacuum pump.

BRIEF DESCRIPTION OF THE DRAWINGS

Various objects features and attendant advantages of the present invention will be readily approached as the same becomes better understood by reference to the following detailed description of a preferred embodiment when considered in connection with the accompanying SOLE FIGURE wherein:

The SOLE FIGURE shows a preferred embodiment of the present invention.

DETAILED DESCRIPTION OF THE PREFERRED EMBODIMENT

In the SOLE FIGURE reference numeral 1 represents a screw of the injection molding machine, 2 a cylinder, and 3 a vent port. The molten resin advanced forward by the screw 1 through the cylinder 2 is removed from gas, water and other voltile substances at the vent 3. Reference number 4 indicates a mist separator, 8 a vacuum pump, 7 an air-water separator tank and 6 a deodorizing device. The exhaust gas from the vent 3 passes through the mist separator 4 and is drawn into the vacuum pump 8, from which it is sent to the air-water separator tank 7 and deodorizing device 5 and then released into the atmosphere.

The air-water separator tank 7 consists of a cooling pipe 71 disposed in the lower part thereof and a water removing plate 72 disposed in the upper part thereof for preventing water of moisture from getting into the deodorizing device 6. The deodorizing device 6 contains a heater 61 and layers of catalysts 62 such as platinum catalysts disposed above the heater 51. Reference numeral 41 denotes a bypass valve, 42 and 43 are inlet and outlet valves, respectively, for the mist separator 4, and reference numerals 5 and 9 represent solenoid operated directional control valves. Reference numeral 10 represents a fixed orifice, 12 a cooling water tank, 11 a blower and 13 a ball valve.

The operation of this device will now be explained in the following manner. The resin supplied from the hopper of the injection molding machine is melted, kneaded and advanced by the screw 1 through the cylinder 2. The screw has the operations of rotation, stopping and advancing. If the vent port were continuously applied with the negative pressure, the molten resin would escape from the vent port. Therefore, the vent port is applied with negative pressure only when the screw is rotating.

In the other case, it is kept in a pressurized condition. The blower 14 and the vacuum pump 8 are continuously running. While the screw 1 is rotating, the solenoid operated valve 5 is turned off and the other solenoid operated valve 9 is turned on to open the ball valve 13 and extract the gas from the vent port 3 by the vacuum pump 8. As a result, negative pressure is communicated to the vent port 3 and the gas released from the molten resin is first removed from mist by the mist separator 4 and passed through the ball valve 13 and the vacuum pump 8 into the air-water separator tank 7 where the water is separated by the cooling action of the cooling water pipe 71 and the gas is sufficiently removed from water by water removing plate 72. The dewatered gas is now sent to the deodorizing device 6. Therefore, even if a large amount of water is sucked and delivered by the vacuum pump 8 together with a large amount of air, the exhaust gas treatment device according to this invention can prevent secondary pollution due to the water transter.

The gas sent into the deodorizing device 6 is heated by the heater 61 and tar is removed by the layers of catalysts 62 and the purified air is then released by the blower 11 into the open air. The blower 11 may be installed between the air-water separator tank 7 and the deodorizing device 6 to pressurize the exhaust gas and send it to the deodorizing device 6.

When the screw 1 stops rotating, the electromagnetic valve 9 is turned off to close the ball valve 13 and the other electromagnetic valve 5 is turned on to supply air from the blower 15 to the vent port 3, thereby pressurizing the vent port 3. At the same time, a small amount of air is sent to the vacuum pump 8 through the stationary orifice 10 to prevent the pump from breaking the water film. Thus, the vacuum pump 8 is protected.

When the screw 1 starts rotating, the above process is repeated. It is necessary to reduce the pressure in the vent port to −680 to −720 mm Hg immediately after the screw has started rotating. Since in the device according to this invention the deodorizing device is located downstream of the vacuum pump, the resistance between the vacuum pump and the vent port is small so that a vacuum pump of small capacity can be used. The vacuum pump 8 rotates so as to suck the water in the air-water separator tank 7 at a head pressure of from 300 to 500 mm Ag. The water for the vacuum pump 8 is added in the closed loop so that if water-soluble noxious components are exhausted accompanied with resins such as ABS resins dissolved in the water, secondary pollution by the noxious components can be prevented since the polluted water is not directly released outside the plant and is periodically replaced.

As already explained, the exhaust gas treatment device of this invention is characterized by the fact that when the screw is not rotating, the vent port is pressurized and when the screw starts rotating the pressure at the vent port is rapidly reduced to a required level, whereby the exhaust gas from the vent port can be effectively disposed of. Other features of this invention are that the vacuum pump of small capacity can be used in the device and that this device can prevent the secondary pollution by polluted water which as in the conventional devices is discharged from the vacuum pump.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patents of the United States is:

1. A waste gas discharging device for use with an injection molding machine including a vent hole which comprises:

a mist separator communicating with said vent hole;

a first blower;

a control valve communicating said first blower with said mist separator, said control valve operating to selectively communicate said blower to said vent hole through said mist separator;

a vacuum pump;

ball valve means communicating said vacuum pump with said mist separator, said ball valve means operating to selectively communicate said vacuum pump with said vent hole through said mist separatio;

air-water separator means communicating with the output of said vacuum pump for receiving waste gas from said vent hole and for separating water therefrom;

deodorizer means communicating with said air-water separator means for purifying the waste gas discharge of said vent hole; and a second blower communicating with said deodorizer means, said second blower acting to remove the purified waste gas from said deodorizer means.

2. A waste gas discharing device for use with an injection molding machine including a vent hole as set forth in claim 1 which further comprises:

fixed orifice means coupled in parallel with said ball valve means for bypassing said ball valve means and for protecting said vacuum pump when said ball valve means is in the closed position.

3. A waste gas discharing device for use with an injection molding machine including a vent hole as set forth in claim 1 wherein said air-water separator means comprises:

a housing;

a cooling coil positioned in the lower portion of said housing, said cooling coil being supplied with cooling water, said cooling coil operating to condense water vapor contained in said waste gas discharge; and a water removing plate positioned in the upper portion of said housing, said plate acting to separate water droplets from said waste gas discharge.

4. A waste gas discharging device for use with an injection molding machine including a vent hole as set forth in claim 1 wherein said deodorizer means comprises:

heater means for heating said waste gas discharge; and catalyst means positioned above said heater means of purifying said waste gas discharge.

* * * * *

UNITED STATES PATENT AND TRADEMARK OFFICE
CERTIFICATE OF CORRECTION

PATENT NO. : 4,247,519

DATED : January 27, 1981

INVENTOR(S) : TSUTOMU SANO

It is certified that error appears in the above—identified patent and that said Letters Patent is hereby corrected as shown below:

On The Title Page:

Insert -- [30] FOREIGN APPLICATION PRIORITY DATA

December 4, 1978, Japan 53/167190

Signed and Sealed this

Ninth Day of June 1981

[SEAL]

Attest:

RENE D. TEGTMEYER

Attesting Officer         Acting Commissioner of Patents and Trademarks